United States Patent [19]

Ledebuhr

[11] Patent Number: 5,363,222
[45] Date of Patent: Nov. 8, 1994

[54] COMPACT OPTICAL SYSTEM FOR A SINGLE LIGHT VALVE FULL-COLOR PROJECTOR

[75] Inventor: Arno G. Ledebuhr, Pleasanton, Calif.

[73] Assignee: Hughes Aircraft Company, Los Angeles, Calif.

[21] Appl. No.: 951,291

[22] Filed: Feb. 3, 1992

Related U.S. Application Data

[63] Continuation of Ser. No. 362,733, Jun. 7, 1989, abandoned.

[51] Int. Cl.$^5$ .............................. G02F 1/13
[52] U.S. Cl. .................... 359/40; 359/63; 359/70
[58] Field of Search ............ 350/331 R; 359/40, 41, 359/63, 70, 71

[56] References Cited

U.S. PATENT DOCUMENTS

| | | | |
|---|---|---|---|
| 4,127,322 | 11/1978 | Jacobson et al. | 350/342 |
| 4,425,028 | 1/1984 | Gagnon et al. | 350/345 |
| 4,690,526 | 9/1987 | Ledebuhr | 350/331 R |
| 4,826,311 | 5/1989 | Ledebuhr | 350/331 R |
| 4,995,702 | 2/1991 | Aruga | 350/331 R |
| 5,040,877 | 8/1991 | Bline et al. | 359/63 |

*Primary Examiner*—Andrew J. James
*Assistant Examiner*—Courtney A. Bowers
*Attorney, Agent, or Firm*—W. K. Denson-Low

[57] ABSTRACT

A compact optical system 10 for use with a single light valve full color system. The compact optical system 10 includes a prepolarizing beamsplitter 12 which extracts a beam of horizontally polarized light form an unpolarized/analyzer 14. The polarizer/analyzer 14 transmits the beam to a first dichroic separator 16 which transmits the red and green components and reflects the blue component toward a first fold mirror 18. The mirror 18 reflects the beam of blue light to a first fold prism 22 and to a first region 21 of a liquid crystal layer 19 of a light valve 23. A second dichroic separator 20 reflects the red beam component toward a second fold prism 24 and transmits the green component to a third fold prism 26. The prisms 24 and 26 direct the red and green beams toward second and third regions 25 and 27, respectively. The blue, red and green beams of horizontally polarized light incident on the first, second and third regions 21, 25 and 27 of the surface 19 are then polarization modulated by first, second and third CRTs 30*a,b,c,* focused on the photosensitive layer 29. The polarization modulated beams of vertically polarized light returned from the light valve are recombined into a single beam that is converted into a brightness modulated beam which is projected by projection optics 40 comprising a single optical lens providing a high brightness, full color image on a viewing screen.

5 Claims, 1 Drawing Sheet

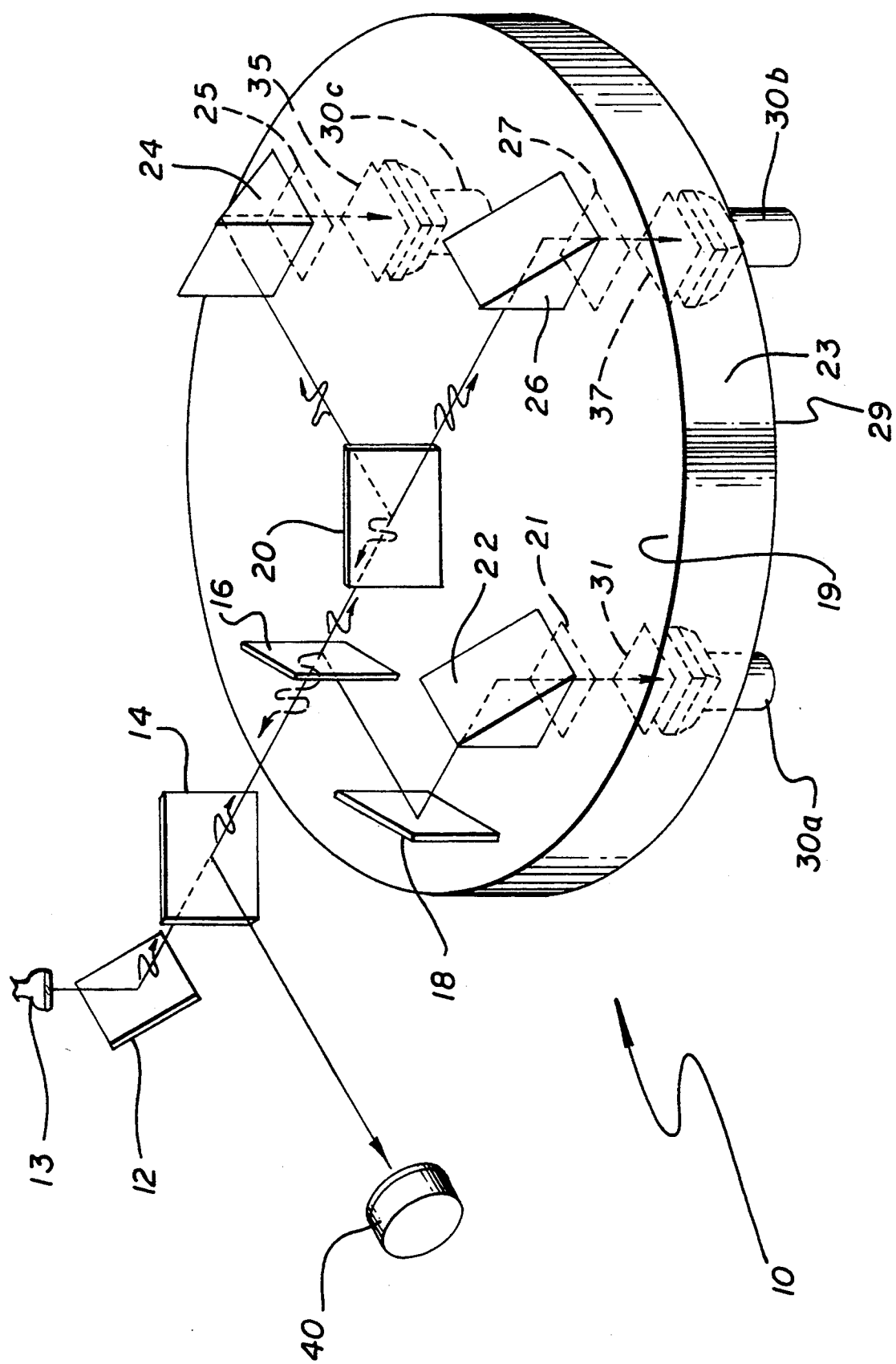

COMPACT OPTICAL SYSTEM FOR A SINGLE LIGHT VALVE FULL-COLOR PROJECTOR

This is a continuation of application Ser. No. 07/362,733, filed Jun. 7, 1989 now abandoned.

BACKGROUND OF THE INVENTION

1. Field of the Invention

This invention relates to liquid crystal light valve (LCLV) projectors. More specifically, this invention relates to optical arrangements used in full color LCLV image projectors.

While the present invention is described herein with reference to an illustrative embodiment for a particular application, it is understood that the invention is not limited thereto. Those having ordinary skill in the art and access to the teachings provided herein will recognize additional modifications, applications and embodiments within the scope of the present invention.

2. Description of the Related Art

The development of the liquid crystal light valve has facilitated substantial progress in the state of the art of high quality large screen projection systems. The reflective mode liquid crystal light valve is a thin film multi-layer structure comprising a liquid crystal layer, a dielectric mirror, a light blocking layer, and a photoresponsive layer sandwiched between two transparent electrodes. A polarized projection beam is directed through the liquid crystal layer to the dielectric mirror. An input image of low intensity light, such as that generated by a cathode ray tube is then applied to the photoresponsive layer thereby switching the electric field across the electrodes from the photoresponsive layer onto the liquid crystal layer to activate the liquid crystal. The beam of linearly polarized projection light reflected from the dielectric mirrors is polarization modulated in accordance with the input image incident on the photoconductor from a source of writing light such as a cathode ray tube (CRT). Therefore, the light valve will convert a high intensity beam of polarized light into a polarization modulated replica of a high resolution input image. (U.S. Pat. No. 4,019,807 issued to D. D. Boswell on Apr. 26, 1977 disclosed such a high performance reflective mode liquid crystal light valve.) The resultant beam of high intensity polarization modulated light can be projected with magnification to produce a high brightness image on a viewing screen.

The first large screen projection systems based on liquid crystal light valve technology produced a projection image which was essentially monochromatic. A single light valve was used to modulate the polarization state of a monochromatic beam. Such a system is described in an article entitled "Application of the Liquid Crystal Light Valve to a Large Screen Graphics Display" published in the 1979 Society for Information Display (SID), International Symposium, Digest of Technical Papers, May 1979, pp. 22-33. The display system described in this paper projects a large scale image having yellow-white characters on a dark blue background.

Subsequent advances in the art have led to the development of full color large screen projection systems using multiple liquid crystal light valves. (See U.S. Pat. No. 4,425,028 issued to R. J. Gagnon and R. T. Carson on Jan. 10, 1984.) These full color projection systems typically direct three beams of polarized light to three separate liquid crystal light valves. Each light valve is controlled by the input image received from a separate CRT. Thus, the light valves provide three high intensity polarization modulated beams which are recombined for projection.

These conventional full color liquid crystal light valve image projection systems direct separate red, green and blue beams of polarized light in at least two directions. As the liquid crystal surface of a light valve must be oriented at a ninety degree angle with respect to the incident light beam, this necessitates the use of physically separate, individual light valves oriented in at least two different directions. As liquid crystal light valves are somewhat costly, the use of multiple light valves adds significantly to the cost of the LCLV projection system.

Accordingly, there is a need in the art for a compact optical arrangement for full color liquid crystal light valve image projection which would not require multiple liquid crystal light valves.

SUMMARY OF THE INVENTION

The need in the art is addressed by the present invention which provides a compact, full color liquid crystal light valve projection system using a single light valve.

The invention includes a first dichroic separator for separating polarized light from a source into first and second beams. The first beam consists of light of a first color and the second beam consisting of light of second and third colors. A second dichroic separator is included for separating the second beam into third and fourth beams. The third beam consists of light of the second color and the fourth beam consists of light of the third color. The arrangement of the present invention directs the first, third and fourth beams into parallel relation toward a common surface at which the single light valve may be mounted.

In a specific embodiment, the invention includes a prepolarizing beamsplitter which splits a high intensity beam of unpolarized white light into a beam of vertically polarized light which is transmitted out of the system, and a beam of horizontally polarized light which is reflected into a polarizer/analyzer oriented at ninety degrees with respect to the prepolarizer. The polarizer/analyzer transmits the horizontally polarized beam received from the prepolarizer to a first dichroic separator. The first dichroic separator transmits the red and green components of the horizontally polarized beam and reflects the blue component of the horizontally polarized beam toward a first fold mirror. The first fold mirror reflects the horizontally polarized beam of blue light toward a first fold prism which directs the horizontally polarized beam of blue light toward a first region of the liquid crystal layer of a liquid crystal light valve.

The red and green components of the horizontally polarized beam transmitted by the first dichroic separator are received by a second dichroic separator. The second dichroic separator reflects the red component of the horizontally polarized beam toward a second fold prism and transmits the green component of the horizontally polarized beam of light to a third fold prisms. The second and third fold prism direct the red and green beams of horizontally polarized light toward second and third regions of the liquid crystal layer of the liquid crystal light valve.

The blue, red and green beams of horizontally polarized light incident on the first, second and third regions of the liquid crystal surface of the light valve are then polarization modulated according to the writing light of a first, second and third CRT focused on the photosensitive layer beneath the first, second and third regions of the liquid crystal layer of the light valve. The polarization modulated blue, red and green beams of horizontally polarized light are reflected by the dielectric layer of the light valve, and are returned as polarization modulated blue, red and green beams of vertical polarization.

The polarization modulated blue, red and green beams of vertically polarized light from the light valve are recombined by the first and second dichroic separators into a single beam. The beam is then directed by the polarizer/analyzer to projection optics for projection in a conventional manner.

BRIEF DESCRIPTION OF THE DRAWINGS

The FIGURE is a perspective view of the optical arrangement of the present invention.

DESCRIPTION OF THE INVENTION

As shown in the perspective view of the figure, the optical arrangement of the present invention 10 includes a prepolarizing beamsplitter 12 aligned in the path of a first beam of unpolarized light from a conventional high intensity white light source 13. The prepolarizing beamsplitter 12 is preferably a polarization selective light dividing interference coating or multi-refractive layer device of the type described in U. S. Pat. No. 2,403,431, issued to MacNellie. The prepolarizing beamsplitter 12 separates the first beam of unpolarized white light into a beam of vertically polarized light and a beam of horizontally polarized light. The vertically polarized beam is represented in the figure as a dashed wave while the horizontally polarized beam is represented as a solid wave. The beam of vertically polarized light is transmitted out of the system. The beam of horizontally polarized light is reflected toward a first polarizer/analyzer 14.

The polarizer/analyzer 14 is, preferably, also a polarization selective light dividing interference coating or multi-refractive layer device of the type described in the above-identified MacNellie patent. The polarizer/analyzer 14 is oriented at 90 degrees with respect to the prepolarizing beamsplitter 12. This orientation allows the polarizer/analyzer 14 to transmit the beam of horizontally polarized light reflected from the prepolarizing beamsplitter 12 toward a first dichroic separator 16. The dichroic separator 16 is of conventional design and uses wavelength selective thin film coatings to reflect light of one color while transmitting light of other colors without affecting the polarization states of the transmitted or reflected beams.

The first dichroic separator 16 receives the horizontally polarized beam from the polarizer/analyzer 14 and reflects horizontally polarized blue light toward a first fold mirror 18 while transmitting red and green horizontally polarized light toward a second dichroic separator 20. The first fold mirror 18 reflects the blue horizontally polarized light received from the first dichroic separator 16 toward a first fold prism 22. The first fold prism reflects the blue horizontally polarized light received from the first fold mirror 18 toward a first region 21 of the liquid crystal layer 19 of a conventional liquid crystal light valve 23.

The second dichroic separator 20 receives the red and green horizontally polarized light from the first dichroic separator 16 and reflects red horizontally polarized light toward a second fold prism 24 while transmitting green horizontally polarized light toward a third fold prism 26. The second fold prism 24 directs the red horizontally polarized light received from the second dichroic separator 20 to a second region 25 of the liquid crystal layer 19 of the liquid crystal light valve 23. The third fold prism 26 directs the green horizontally polarized light received from the second dichroic separator 20 to a third region 27 of the liquid crystal layer 19 of the liquid crystal light valve 23. Note that first, second and third fold prisms 22, 24 and 26 are used to direct the blue, red and green beams to the light valve to insure that each beam has the same path length especially from the reflecting surface of the fold prisms to the surface 19 of the light valve 23. This, in turn, insures that the beams may be optimally recombined as discussed more fully below. Hence, blue, red and green beams of horizontally polarized light from the first, second and third fold prisms 22, 24 and 26, respectively, are incident on first, second and third regions 21, 25 and 27, respectively, of the liquid crystal layer 19 of the liquid crystal light valve 23.

In the preferred embodiment, the input images from first, second and third small CRTs 30a, 30b, 30c (approximately 1" square) are focused on first, second and third regions 31, 35 and 37 respectively of the photoresponsive underside 29 of the light valve 23 in direct alignment with the first, second and third regions 21, 25 and 27, respectively, of the liquid crystal layer 19 of the light valve 23. Thus, the blue, red and green beams of horizontally polarized light incident on the first, second and third regions 21, 25, and 27, respectively, of the liquid crystal layer 19 of the light valve 23 are polarization modulated in accordance with the input image provided by the first, second and third CRTs 30a, 30b, 30c in an otherwise conventional manner.

The liquid crystal light valve 23 converts a beam of light of one polarization state into a polarization modulated beam of a second polarization state. Thus, the blue, red and green beams of horizontally polarized light incident on the light valve 23 are returned as beams of blue, red and green light which have been polarization modulated in accordance with the input images provided by the first, second and third CRTs 30a, 30b, 30c.

The green beam of polarization modulated, vertically polarized light returned from the light valve 23 retraces its path through the third fold prism 26 to the second dichroic separator 20 which transmits the polarization modulated green beam toward the first dichroic separator 16. The red beam of polarization modulated, vertically polarized light returned from the light valve 23 retraces its path through the second fold prism 24 to the second dichroic separator 20 which reflects the polarization modulated red beam toward the first dichroic separator 16. Thus, the second dichroic separator 20 effectively recombines the polarization modulated beams of red and green vertically polarized light returned from the light valve 23 into a single beam of vertically polarized light which is directed toward the first dichroic separator 16.

The blue beam of polarization modulated, vertically polarized light returned from the light valve 23 retraces its path through the first fold prism 22 and the first fold mirror 18, which reflects it toward the first dichroic separator 16. The first dichroic separator 16 reflects the blue beam of polarization modulated, vertically polarized light received from the first fold mirror 18 toward the polarizer/analyzer 14. The first dichroic separator 16 also transmits the polarization modulated beam of red and green vertically polarized light received from the second dichroic separator 20 to the polarizer/analyzer 14. In effect, the first dichroic separator 16 recombines the polarization modulated beams of blue, red and green vertically polarized light into a single beam of vertically polarized light which is directed toward the polarizer/analyzer 14.

The polarizer/analyzer 14 converts the polarization modulated beam of blue, red and green light received from the first dichroic separator 16 into a beam of brightness modulated blue, red and green light which is directed toward projection optics 40 for projection in a conventional manner.

The present invention has been described herein with reference to a particular embodiment for a particular application. Nonetheless, the invention is not limited thereto. Those of ordinary skill in the art and access to the teachings provided herein will recognize additional modifications, applications, and embodiments within the scope thereof. For example, the invention is not limited to the configurations shown for the polarizers and color separating filters. For example, a blue reflector, green reflector combination (two long pass filters) could be used which would interchange the location of the red and green channels of the figure. A second companion filter would then be needed to reflect either the blue or red wavelengths. In addition, the arrangement may be designed to input a vertical instead of a horizontal component without departing from the scope of the present teachings.

It is intended by the appended claims to cover any and all such modifications, applications, and embodiments within the scope of the invention.

Accordingly,

What is claimed is:

1. A full color liquid crystal light valve image projection system comprising:
   a source of polarized light;
   a reciprocal optical arrangement which provides equal optical path lengths for light of each color from input to the optical arrangement to output from the optical arrangement, the elements of said optical arrangement being disposed in a common plane including:
       a first polarizing beamsplitter means for separating light from said source into first and second beams, said first beam consisting of light of a first polarization state and said second beam consisting of light of a second polarization state;
       a second polarizing beamsplitter means for transmitting light of said second polarization state and reflecting light of said first polarization state;
       a first dichroic separator means for separating said second beam into third and fourth beams, said third beam consisting of light of a first color and said fourth beam consisting of light of a second color and third color;
       a second dichroic separator means for separating said fourth beam into fifth and sixth beams, said fifth beam consisting of light of said second color and said sixth beam consisting of light of said third color; and
       means for directing said third, fifth and sixth beams into a parallel relation toward a common planar surface, the path lengths of said beams from said first dichroic separator to said common planar surface being equal;
   a liquid crystal light valve means disposed at said common planar surface for modulating said third, fifth and sixth beams in response to input images to provide first, second and third polarization modulated beams, said first, second and third polarization modulated beams being combined into a single beam by said reciprocal optical arrangement; and
   means for projecting said single beam.

2. A full color liquid crystal light valve image projection system as recited in claim 1 wherein said means for directing includes;
   light-folding means for directing the beams received from said first dichroic separator means and said second dichroic separator means into parallel relationship toward said common planar surface.

3. A full color liquid crystal light valve image projection system as recited in claim 1 wherein said common planar surface is parallel to the plane of said optical arrangement.

4. A full color liquid crystal light valve image projection system as recited in claim 1 wherein said means for directing includes:
   a first reflector for directing said third beam in a direction parallel to the direction of said fourth beam; and
   light-folding means for directing the beams received from said first reflector and said second dichroic separator means into parallel relation toward said common planar surface.

5. A full color liquid crystal light valve image projection system as recited in claim 1 wherein said fifth beam is parallel to said fourth beam and consists of light of said second color and said sixth beam is parallel to said third beam and consists of light of said third color.

* * * * *